US012641309B2

(12) United States Patent
Fang et al.

(10) Patent No.: US 12,641,309 B2
(45) Date of Patent: May 26, 2026

(54) PAGE DISPLAY METHOD AND APPARATUS FOR APPLICATION, AND ELECTRONIC DEVICE

(71) Applicant: Beijing Zitiao Network Technology Co., Ltd., Beijing (CN)

(72) Inventors: Mengying Fang, Beijing (CN); Xu Liu, Beijing (CN); Wenjing Liu, Beijing (CN); Xuyuan Xiang, Beijing (CN); Can Yang, Beijing (CN); Haiqian Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/510,380

(22) Filed: Nov. 15, 2023

(65) Prior Publication Data

US 2024/0089528 A1     Mar. 14, 2024

Related U.S. Application Data

(63) Continuation of application No. PCT/CN2022/091604, filed on May 9, 2022.

(30) Foreign Application Priority Data

Jun. 4, 2021    (CN) .......................... 202110624333.1

(51) Int. Cl.
*H04N 21/431*         (2011.01)
*H04N 21/2187*        (2011.01)
(Continued)

(52) U.S. Cl.
CPC ..... *H04N 21/4316* (2013.01); *H04N 21/2187* (2013.01); *H04N 21/4782* (2013.01); *H04N 21/488* (2013.01)

(58) Field of Classification Search
CPC .......... H04N 21/4316; H04N 21/2187; H04N 21/4782; H04N 21/488
(Continued)

(56) References Cited

U.S. PATENT DOCUMENTS

| | | | |
|---|---|---|---|
| 2002/0166122 A1* | 11/2002 | Kikinis | .......... H04N 21/234363 725/56 |
| 2005/0149988 A1* | 7/2005 | Grannan | .......... H04N 21/47202 725/136 |

(Continued)

FOREIGN PATENT DOCUMENTS

| | | |
|---|---|---|
| CN | 105657560 A | 6/2016 |
| CN | 106331761 A | 1/2017 |

(Continued)

OTHER PUBLICATIONS

European Patent Office, Extended European Search Report Issued in Application No. 22814967.0, Jun. 21, 2024, 7 pages.
(Continued)

*Primary Examiner* — Sahar Aqil Riaz
(74) *Attorney, Agent, or Firm* — Alleman Hall LLP

(57) ABSTRACT

A page display method and apparatus for an application, and an electronic device are provided. The method includes: receiving a play instruction for multimedia content in the application; and in response to the play instruction, in the case that the multimedia content belongs to a preview stream of an online live broadcast, playing the multimedia content and displaying real-time information of the online live broadcast. The real-time information of the online live broadcast includes at least one of a live broadcast commentary or a live broadcast explanation.

13 Claims, 6 Drawing Sheets receiving a play instruction for multimedia content in the application    ⌐S101 in response to the play instruction, in a case that the multimedia content belongs to a preview stream of the online live broadcast, playing the multimedia content and displaying real-time information of the online live broadcast    ⌐S102

(51) Int. Cl.
   *H04N 21/4782* (2011.01)
   *H04N 21/488* (2011.01)

(58) Field of Classification Search
   USPC ........................................................... 725/37
   See application file for complete search history.

(56) References Cited

U.S. PATENT DOCUMENTS

| | | | | |
|---|---|---|---|---|
| 2008/0060006 A1* | 3/2008 | Shanks | .............. | H04N 21/4316 |
| | | | | 348/E7.071 |
| 2009/0164923 A1* | 6/2009 | Ovi | ........................ | G06F 3/0482 |
| | | | | 715/764 |
| 2014/0059615 A1* | 2/2014 | Sirpal | ................ | H04N 21/4396 |
| | | | | 725/52 |
| 2016/0048398 A1* | 2/2016 | Taylor | ................... | G06F 9/4881 |
| | | | | 717/168 |
| 2016/0150285 A1* | 5/2016 | Thomas | ........... | H04N 21/26283 |
| | | | | 725/50 |
| 2016/0315983 A1* | 10/2016 | Lewis | ..................... | H04L 65/60 |
| 2017/0169800 A1* | 6/2017 | Greco | ................. | H04L 67/5681 |
| 2017/0289589 A1* | 10/2017 | Koumchatzky | .......... | G06N 3/09 |
| 2018/0192142 A1 | 7/2018 | Paul | | |
| 2018/0192154 A1* | 7/2018 | Paul | .............. | H04N 21/234336 |
| 2018/0199110 A1* | 7/2018 | Cormican | .......... | H04N 21/4722 |
| 2019/0058928 A1* | 2/2019 | Halper | ............. | H04N 21/26258 |
| 2019/0149887 A1* | 5/2019 | Williams | ........... | H04N 21/4826 |
| | | | | 725/52 |
| 2020/0099987 A1* | 3/2020 | Petrillo | .............. | H04N 21/4884 |
| 2020/0167173 A1* | 5/2020 | Wang | ................. | G06F 3/04817 |
| 2021/0160584 A1* | 5/2021 | April | ................. | H04N 21/2343 |
| 2022/0368552 A1* | 11/2022 | Xiahou | .............. | H04L 12/1818 |
| 2023/0328330 A1* | 10/2023 | He | ..................... | H04N 21/4788 |
| | | | | 725/37 |
| 2023/0379531 A1* | 11/2023 | Azuolas | .......... | H04N 21/47815 |
| 2023/0410306 A1* | 12/2023 | Anderson | .............. | A61B 3/152 |
| 2024/0012529 A1* | 1/2024 | Jang | ................. | H04N 21/47217 |

FOREIGN PATENT DOCUMENTS

| | | | |
|---|---|---|---|
| CN | 107277639 A | 10/2017 | |
| CN | 108024135 A | 5/2018 | |
| CN | 109413483 A | 3/2019 | |
| CN | 110324696 A | 10/2019 | |
| CN | 106792248 B | 11/2019 | |
| CN | 111641840 A | 9/2020 | |
| CN | 112104899 A | 12/2020 | |
| CN | 112272302 A | 1/2021 | |
| CN | 112492372 A | 3/2021 | |
| CN | 112887749 A | 6/2021 | |
| CN | 113365136 A | 9/2021 | |
| CN | 111641840 B | 2/2022 | |
| EP | 4087258 A1 | 11/2022 | |
| JP | 2018005320 A | 1/2018 | |
| JP | 6491388 B1 | 3/2019 | |
| JP | 6668549 B1 | 3/2020 | |

OTHER PUBLICATIONS

Japan Patent Office, Office Action Issued in Application No. 2023-571430, Aug. 6, 2024, 10 pages.
ISA China National Intellectual Property Administration, International Search Report and Written Opinion for International Application No. PCT/CN2022/091604, mailed Jul. 27, 2022, 18 Pages.
Japan Patent Office, Notice of Reasons for Refusal for Japanese Application No. 2023-571430, mailed Jan. 14, 2025, 8 pages.

* cited by examiner receiving a play instruction for multimedia content in the application ~S101 in response to the play instruction, in a case that the multimedia content belongs to a preview stream of the online live broadcast, playing the multimedia content and displaying real-time information of the online live broadcast ~S102

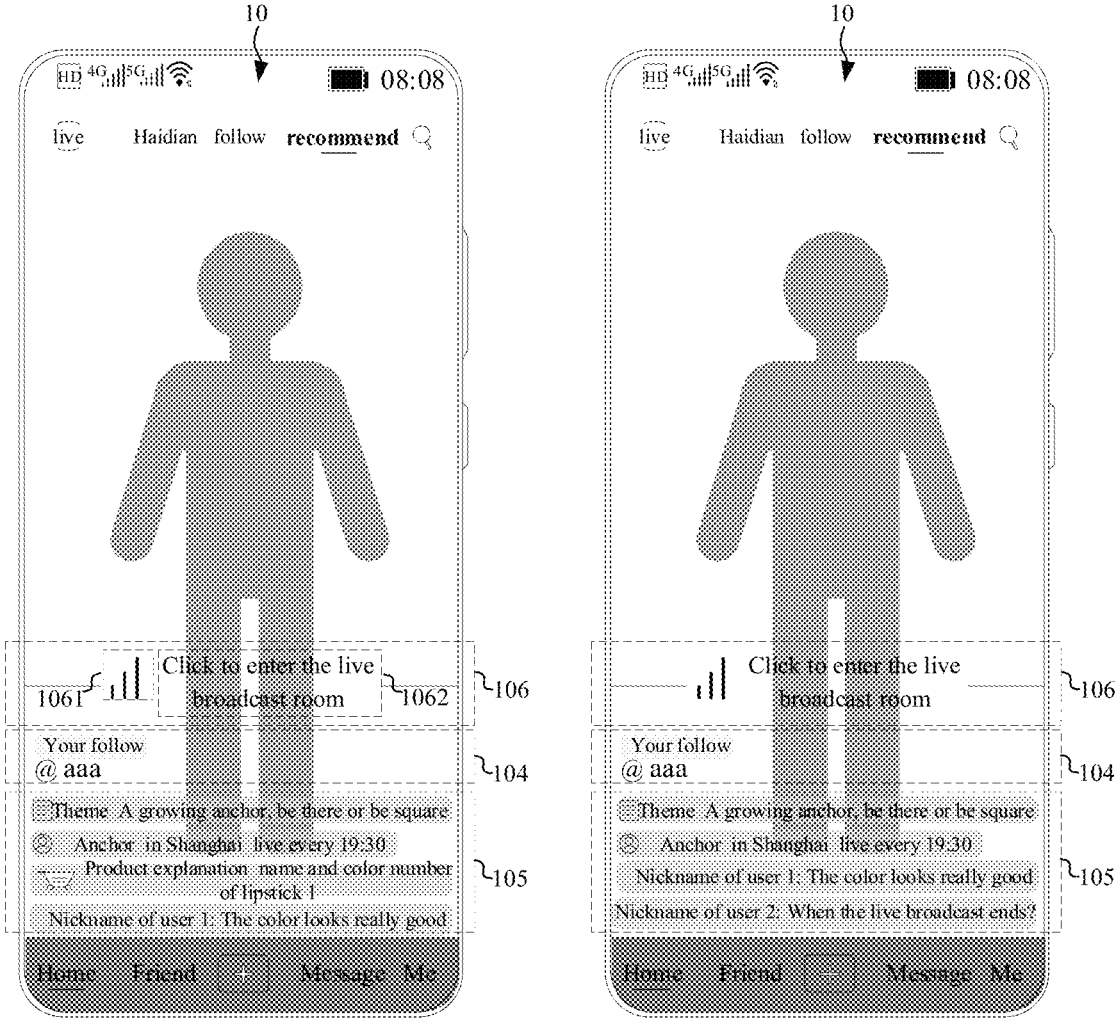
FIG. 2E                                   FIG. 2F

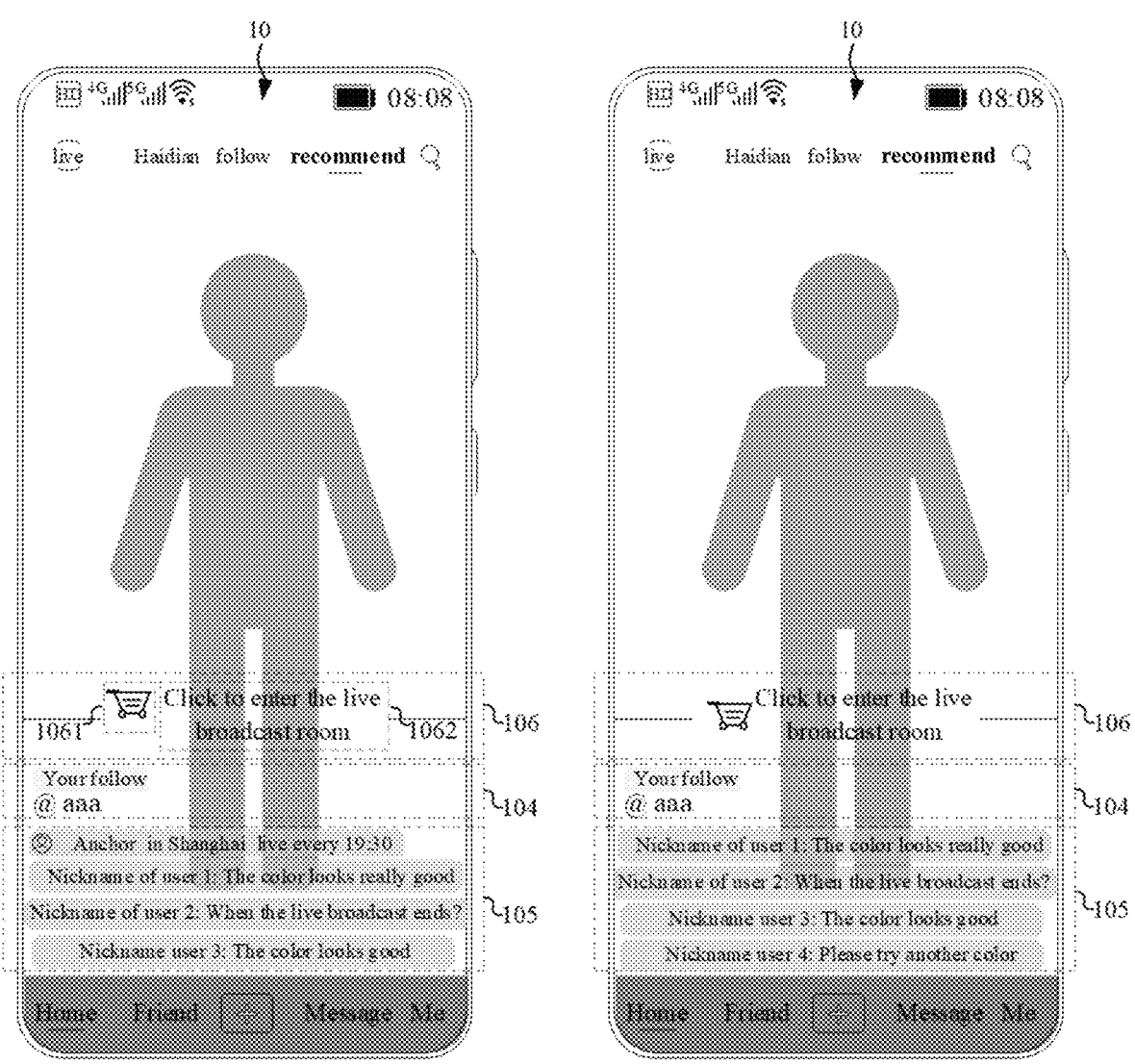
FIG. 2G                    FIG. 2H

FIG. 2I                    FIG. 2J

PAGE DISPLAY METHOD AND APPARATUS FOR APPLICATION, AND ELECTRONIC DEVICE

CROSS-REFERENCE TO RELATED APPLICATIONS

This application is a continuation of International Patent Application No. PCT/CN2022/091604, filed on May 9, 2022, which claims the priority to and benefits of Chinese patent application No. 202110624333.1, filed on Jun. 4, 2021. All the aforementioned patent applications are hereby incorporated by reference in their entireties.

TECHNICAL FIELD

The present disclosure relates to the field of live broadcast technology, and more particularly, to a page display method and apparatus for an application, and an electronic device.

BACKGROUND

With continuous development of internet technology, online live broadcast is widely used in fields such as user interaction and business promotion due to its advantages of low costs, strong interactivity, and so on.

At present, an application (APP) usually displays a preview stream and a live icon of an online live broadcast, so that a user can enter the online live broadcast for watching and interaction. However, the amount of information displayed by the APP for online live broadcast is relatively small, which cannot arouse users' interest in watching the online live broadcast, thereby affecting user experience of using the APP.

SUMMARY

In order to solve the above-described technical problems or at least partially solve the above-described technical problems, the present disclosure provides a page display method and apparatus for an application and an electronic device.

In the first aspect, the present disclosure provides a page display method for an application, which comprises:

receiving a play instruction for multimedia content in the application; and in response to the play instruction, in the case that the multimedia content belongs to a preview stream of an online live broadcast, playing the multimedia content and displaying real-time information of the online live broadcast, wherein the real-time information of the online live broadcast comprises at least one of a live broadcast commentary or a live broadcast explanation.

By using the method provided by the first aspect, after receiving the play instruction for the multimedia content in the application, it is determined whether the multimedia content belongs to a preview stream of an online live broadcast. In the case that the multimedia content belongs to a preview stream of an online live broadcast, the multimedia content can be played and the real-time information of the online live broadcast is displayed, so that the user can browse the real-time dynamics of the online live broadcast, which enriches exhibition content of the online live broadcast, avoids misunderstandings about the preview stream of the online live broadcast, and enhances the user's willingness to enter the online live broadcast for watching and interaction.

In one possible design, the method further comprises:

displaying basic information of the online live broadcast in a fixing manner, and displaying the real-time information of online live broadcast in a scrolling manner.

The basic information of the online live broadcast comprises at least one type of a follow tag, an anchor nickname, or a live broadcast title.

In one possible design, the basic information of the online live broadcast is displayed above or below the real-time information of the online live broadcast.

In one possible design, the method further comprises:

displaying extended information of the online live broadcast in a fixing manner and displaying the real-time information of online live broadcast in a scrolling manner, and after a first preset duration, displaying the real-time information of the online live broadcast and the extended information of the online live broadcast in the scrolling manner; or displaying the real-time information of the online live broadcast and the extended information of the online live broadcast in the scrolling manner.

The extended information of the online live broadcast comprises at least one of a live broadcast location, an anchor age, live broadcast time, or a live broadcast theme.

In one possible design, the method further comprises:

displaying guidance information of the online live broadcast, wherein the guidance information is used to guide a user to enter the online live broadcast.

In one possible design, the guidance information comprises a guide icon and a guide text, and the method further comprises:

after a second preset duration, updating a style of the guide icon and content of the guide text based on a type of the online live broadcast.

In one possible design, the method further comprises:

playing a live stream of the online live broadcast after receiving a viewing instruction for the online live broadcast.

In a second aspect, the present disclosure provides a page display apparatus for an application, which comprises:

a receiving module, configured to receive a play instruction for multimedia content in the application; and a processing module, configured to, in response to the play instruction, in the case that the multimedia content belongs to a preview stream of an online live broadcast, play the multimedia content and display real-time information of the online live broadcast.

The real-time information of the online live broadcast comprises at least one of a live broadcast commentary or a live broadcast explanation.

In one possible design, the processing module is further configured to display basic information of the online live broadcast in a fixing manner and display the real-time information of online live broadcast in a scrolling manner.

The basic information of the online live broadcast comprises at least one type of a follow tag, an anchor nickname, or a live broadcast title.

In one possible design, the processing module is specifically configured to display the basic information of the online live broadcast above or below the real-time information of the online live broadcast.

In one possible design, the processing module is further configured to display extended information of the online live broadcast in a fixing manner and display the real-time information of online live broadcast in a scrolling manner, and after a first preset duration, display the real-time information of the online live broadcast and the extended information of the online live broadcast in the scrolling manner; or, display the real-time information of the online live broadcast and the extended information of the online live broadcast in the scrolling manner. The extended information of the online live broadcast comprises at least one of a live broadcast location, an anchor age, live broadcast time, or a live broadcast theme.

In one possible design, the processing module is further configured to display guidance information of the online live broadcast, and the guidance information is used to guide a user to enter the online live broadcast.

In one possible design, the processing module is further configured to include, in the guidance information, a guide icon and a guide text, and after a second preset duration, update a style of the guide icon and content of the guide text based on a type of the online live broadcast.

In one possible design, the processing module is further configured to play a live stream of the online live broadcast after receiving a viewing instruction for the online live broadcast.

Advantageous effects of the page display apparatus for an application provided by the above-described second aspect and the respective possible designs of the second aspect may be referred to the advantageous effects of the above-described first aspect and various possible designs of above-described first aspect, and no details will be repeated here.

In a third aspect, the present disclosure provides an electronic device, which comprises: one or more processors and a memory. The memory is used to store program instructions. The processor is used to call the program instructions stored in the memory to enable the electronic device to execute the page display method for the application provided by the first aspect and various possible designs of the first aspect.

In a fourth aspect, the present disclosure provides a computer storage medium, which comprises computer instructions. The computer instructions, when running on an electronic device, cause the electronic device to execute the page display method for the application provided by the first aspect and various possible designs of the first aspect.

In a fifth aspect, the present disclosure provides a computer program product. The computer program product, when running on a computer, causes the computer to execute the page display method for the application provided by the first aspect and various possible designs of the first aspect.

In a sixth aspect, the present disclosure provides a chip system, applied to an electronic device including a display, a memory, and a sensor. The chip system includes a processor. When the processor executes computer instructions stored in the memory, the electronic device executes the page display method for an application provided by the first aspect and various possible designs of the first aspect.

BRIEF DESCRIPTION OF THE DRAWINGS

The accompanying drawings here are incorporated into the specification and form a part of the specification, illustrate the embodiments that comply with the present disclosure, and are used for explaining principles of the present disclosure together with the specification.

In order to clearly illustrate the technical solutions of the embodiments of the disclosure or the existing technology, the drawings used in the description of the embodiments or the existing technology are briefly described in the following. Obviously, for ordinary technical personnel in this field, other drawings can also be obtained based on these drawings without any creative labor.

FIG. 2A to FIG. 2L are schematic diagrams of a human-machine interaction interface provided by an embodiment of the present disclosure.

DETAILED DESCRIPTION

Figure 1:
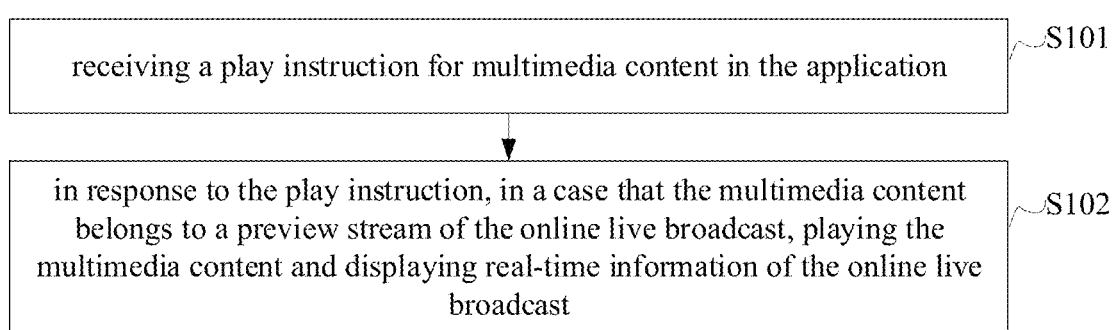
FIG. 1 is a schematic flow chart of a page display method for an application provided by an embodiment of the present disclosure.

In order to better understand the above objectives, features, and advantages of the present disclosure, the following will further describe the scheme of the present disclosure. It should be noted that in the absence of conflict, the embodiments disclosed herein and the features in the embodiments can be combined with each other.

Many specific details are elaborated in the following description to facilitate a full understanding of the present disclosure, but the present disclosure can also be implemented in other ways different from those described here. Obviously, the embodiments in the specification are only a part of the embodiments of the present disclosure, rather than all of the embodiments.

Exemplarily, the present disclosure provides a page display method and apparatus for an application, a device, a computer storage medium, and a computer program product. The electronic device can display real-time information of an online live broadcast while playing a preview stream of the online live broadcast, so as to provide a user with the real-time information of the online live broadcast, and enhance a real-time sense of displaying live information, which is favorable for attracting the user to stay more time for content browsing, and is also favorable for attracting the user to enter the online live broadcast for watching and interaction, thereby improving user experience.

In addition, the electronic device can further display basic information of the online live broadcast, and provide the user with a general introduction to the online live broadcast, so that the user may quickly understand content of the online live broadcast.

In addition, the electronic device can further display extended information of the online live broadcast, and provide the user with a decision-making direction for viewing intention, which facilitates the user to quickly establish interest matching with the online live broadcast, and improves user's viewing intention.

The types of the online live broadcast as mentioned in the present disclosure may include but are not limited to: e-commerce, Q&A, voice, interaction (e.g., microphone communication or PK), music, games, KTV, education, chat, and other types.

The preview stream of the online live broadcast is used to display a portion of the live stream of the online live broadcast, for example, the multimedia content starting from a current live broadcast screen, or the multimedia content starting from an already started live broadcast screen, or the multimedia content related to the online live broadcast. The specific implementation of the preview stream of the online live broadcast is not limited in the present disclosure.

The basic information of the online live broadcast is used to describe basic introduction information of the online live broadcast, and facilitates the user to have a general understanding of the online live broadcast. The specific implementation of the basic information of the online live broadcast is not limited in the present disclosure. In some embodiments, the basic information of the online live broadcast may include: at least one type of a follow tag, an anchor nickname, or a live broadcast title.

For example, when a user has already followed an anchor corresponding to the online live broadcast, the electronic device may adopt a follow tag to display that the user has a follow relationship with the anchor. When the user does not follow the anchor corresponding to the online live broadcast, the electronic device may not display the follow tag, which indicates that the user does not have a follow relationship with the anchor.

The electronic device may display the anchor nickname in a way such as "@+anchor nickname".

The live broadcast title is used to describe live content such as products, questions, music, etc. in the online live broadcast. The electronic device may display the live title by means such as text, letters, characters, and so on. When the number of lines displayed in the live broadcast title does not exceed a first preset value, the electronic device may display the entire content of the live broadcast title. When the number of lines displayed in the live broadcast title exceeds the first preset value, the electronic device may abbreviate and display a portion of the content of the live broadcast title. The specific value of the first preset value is not limited in the present disclosure.

In addition, the display order of the follow tag, the anchor nickname, and the live broadcast title is not limited in the present disclosure.

The real-time information of the online live broadcast is used to describe real-time live information of the online live broadcast, which is convenient to attract the user to stay and watch. The specific implementation of the real-time information of the online live broadcast is not limited in the present disclosure. In some embodiments, the real-time information of the online live broadcast may include: at least one type of live commentary or live explanation.

For example, the electronic device may display the live content such as products, questions, music, etc. in a form of text, characters, etc. in the online live broadcast as live explanation.

In some embodiments, the live explanation may include: product tag and product information as mentioned in the current live broadcast of the online live broadcast. Alternatively, the live explanation may include: question tag and question content as mentioned in the current live broadcast of the online live broadcast. Alternatively, the live explanation may include: music tag and music content played in the current live broadcast of the online live broadcast.

The electronic device may display currently and/or previously exhibited live commentary in the online live broadcast by means of nickname and comment content of the comment user. In some embodiments, the live commentary may include: user nickname and comment content of the live commentary in the current live broadcast of the online live broadcast.

In addition, when both the live commentary and the live explanation need to be exhibited simultaneously, the electronic device may display the live explanation above the live commentary, that is, firstly display the live explanation, and then display the live commentary.

The extended information of the online live broadcast is used in content extended information of the online live broadcast, which differs from the basic information and has a strong correlation with the user, so as to facilitate the user to decide whether to further understand the online live broadcast. The specific implementation of the extended information of the online live broadcast is not limited in the present disclosure. In some embodiments, the extended information of the online live broadcast may include: at least one type of live broadcast location, anchor age, live broadcast time, or live broadcast theme.

The live broadcast theme is used to describe relevant information of the anchor corresponding to the online live broadcast, and/or to describe central idea or core content of the online live broadcast.

For example, the electronic device may display live broadcast location, anchor age and live broadcast time in an aggregate manner by means of text, digits, characters, and icons, etc.; and may separately display the live broadcast theme by means of text, digits, characters, and icons, etc. When the number of displayed lines of the extended information exceeds a second preset value, the electronic device may abbreviate and display a portion of content of the extended information. When the number of displayed lines of the extended information does not exceed the second preset value, the electronic device may display the entire content of the extended information. The specific value of the second preset value is not limited in the present disclosure.

The page display method for an application according to the present disclosure is executed by the electronic device or an application (APP), an official account, a web page, etc. in the electronic device. The electronic device may be a device such as a tablet personal computer, a mobile phone, a wearable device, a vehicle-mounted device, an augmented reality (AR)/virtual reality (VR) device, a laptop, an ultra-mobile personal computer (UMPC), a netbook, a personal digital assistant (PDA), a smart TV, a smart screen, a high-definition TV, a 4K TV, a smart speaker, a smart projector, etc. The specific type of the electronic device is not limited in the present disclosure.

The type of the operating system of the electronic device is not limited in the present disclosure, which may be, for example, Android system, Linux system, Windows system, iOS system, etc.

Based on the foregoing description, the page display method for an application provided by the present disclosure will be explained in detail, by taking the electronic device as an example in conjunction with the accompanying drawings and application scenarios according to the embodiment of the present disclosure.

Referring to FIG. 1, FIG. 1 is a schematic flow chart of a page display method for an application provided by an embodiment of the present disclosure. As illustrated in FIG. 1, the page display method for an application provided by the present disclosure may include following steps.

S101: receiving a play instruction for the multimedia content in the application.

The electronic device may receive a play instruction of a user for the multimedia content in an application, during or after startup of the application.

The type of the application and content and duration of the multimedia content are not limited in the present disclosure. The play instruction is used to instruct the electronic device to play the multimedia content. The specific implementation of the play instruction is not limited in the present disclosure. In some embodiments, the play instruction may include but is not limited to operations such as clicking, double clicking, long pressing, sliding, etc.

S102: in response to the play instruction, in the case that the multimedia content belongs to a preview stream of the online live broadcast, playing the multimedia content and displaying real-time information of the online live broadcast.

Since the electronic device may not only play a shared video but also play a live stream, the electronic device may determine the type of the multimedia content after receiving the play instruction. When determining that the multimedia content belongs to a preview stream of an online live broadcast, the electronic device may display the real-time information of the online live broadcast while playing the multimedia content. That is, the electronic device may display the real-time information of the online live broadcast on a play page of the multimedia content, so as to transmit real-time dynamics of the online live broadcast to the user, and guide the user to enter the online live broadcast for watching and interaction.

In the page display method for an application provided by the present disclosure, it is determined whether the multimedia content belongs to a preview stream of an online live broadcast after receiving a play instruction for the multimedia content in the application. When the multimedia content belongs to a preview stream of an online live broadcast, the multimedia content may be played and real-time information of the online live broadcast may be displayed, so that the user may browse real-time dynamics of the online live broadcast, which enriches display content of the online live broadcast, avoids misunderstandings about the preview stream of the online live broadcast, and enhances the user's willingness to enter the online live broadcast for watching and interaction.

Based on description of the embodiment in step S102, the electronic device may simultaneously display the basic information of the online live broadcast and the real-time information of the online live broadcast. In some embodiments, on the page for playing the multimedia content, the electronic device may display the basic information of the online live broadcast in a fixing manner, and display the real-time information of the online live broadcast in a scrolling manner.

The displaying in a fixing manner may be understood as stable exhibition in a region on the page for playing the multimedia content, while the displaying in a scrolling manner may be understood as scrolling exhibition left and right or scrolling exhibition up and down in another region on the page for playing the multimedia content.

It should be noted that after performing the trigger instruction on the basic information of the online live broadcast, the electronic device may display an account page of the anchor corresponding to the online live broadcast. After performing the trigger instruction on the real-time information of the online live broadcast, the electronic device may shield the foregoing trigger instruction.

In addition, the display order of the basic information and the real-time information of the online live broadcast is not limited in the present disclosure. In some embodiments, the electronic device may display the basic information of the online live broadcast above or below the real-time information of the online live broadcast.

Based on description of the above-described embodiments, in addition to the basic information of the online live broadcast and the real-time information of the online live broadcast, the electronic device may further display the extended information of the online live broadcast, so as to provide the user with effective content extended information, which helps cultivate the user's interest in entering the online live broadcast.

The exhibition mode of the extended information of the online live broadcast is not limited in the present disclosure. In general, the extended information of the online live broadcast and the real-time information of the online live broadcast are usually displayed in a same region on the page for playing the multimedia content.

In some embodiments, the electronic device may display the extended information of the online live broadcast in a fixing manner and display the real-time information of the online live broadcast in a scrolling manner. After the first preset duration, the electronic device may display the real-time information of the online live broadcast and the extended information of the online live broadcast in a scrolling manner. The first preset duration may be set based on actual situations, which is not limited in the present disclosure.

In summary, the electronic device may exhibit the extended information of the online live broadcast in a hovering manner, so that the user may make choose whether to watch the online live broadcast based on the extended information. The electronic device may also exhibit the real-time information of the online live broadcast in a scrolling manner, so that the user may browse real-time dynamics of the online live broadcast in real time.

In some other embodiments, the electronic device may display the real-time information of the online live broadcast and the extended information of the online live broadcast in a scrolling manner.

In summary, the electronic device may display the extended information of the online live broadcast and the real-time information of the online live broadcast in a scrolling manner, the exhibition direction of which is simple and clear, so that the user may make choose whether to watch the online live broadcast based on the extended information of the online live broadcast, and so that the user may browse real-time dynamics of the online live broadcast in real time.

Based on the description of the above-described embodiments, in addition to the real-time information of the online live broadcast and the basic information of the online live broadcast, or in addition to the basic information of the online live broadcast, the real-time information of the online live broadcast, and the extended information of the online live broadcast, the electronic device may further display guidance information of the online live broadcast, so that the user may quickly understand the type of the online live broadcast, so as to guide the user to enter the online live broadcast for watching and interaction.

The guidance information is used to guide the user to enter in the online live broadcast. The guidance information is related to the type of the online live broadcast. The specific implementation of the guidance information is not limited in the present disclosure.

In some embodiments, the guidance information may include: guide icon and guide text. The guide icon is used to indicate that the multimedia content is in a live state. The guide text is used to describe guidance for entering the online live broadcast. The specific implementation of the guide icon and the guide text is not limited in the present disclosure. Thus, after the second preset duration, the electronic device may update the style of the guide icon and content of the guide text based on the type of the online live broadcast, so that different types of online live broadcast are differentiated, thereby meeting the user's demand for visually understanding of the online live broadcast.

The style of the guide icon and the content of the guide text updated are related to the type of the online live broadcast. The updated guide icon is used to indicate the type of the online live broadcast. The updated guide text is used to describe guidance for entering an online live broadcast of corresponding type. The second preset duration may be set based on actual situations, which is not limited in the present disclosure.

In summary, the electronic device may update the guidance information based on the type of the online live broadcast, so that the user may quickly understand the type of the online live broadcast, so as to guide the user to enter the online live broadcast for watching and interaction.

Based on the description of the above-described embodiments, the electronic device may play the live stream of the online live broadcast after receiving the viewing instruction for the online live broadcast.

The viewing instruction is used to instruct electronic device to play the live stream of the online live broadcast. The specific implementation of the viewing instruction is not limited in the present disclosure. In some embodiments, the viewing instruction may include but is not limited to operations of various types such as clicking, double clicking, long pressing, sliding, etc.

In summary, the electronic device may play the live stream of the online live broadcast based on subjective will of the user.

Based on the description of the above-described embodiments, the electronic device may determine the type of another multimedia content after receiving a play instruction for another multimedia content in the application. In the case that another multimedia content belongs to a preview stream of another online live broadcast, the electronic device may display basic information of another online live broadcast and real-time information of another online live broadcast while playing another multimedia content according to the description of the embodiment in step S102. In the case that another multimedia content does not belong to a preview stream of another online live broadcast, the electronic device may play another multimedia content.

The play instruction is used to instruct the electronic device to play another multimedia content. The specific implementation of the play instruction is not limited in the present disclosure. In some embodiments, the play instruction may include but is not limited to operations of various types such as clicking, double clicking, long pressing, sliding, etc.

In summary, the electronic device may also have a function of simultaneously playing a plurality of pieces of multimedia content in the application.

Hereinafter, the page display method for an application according to the present disclosure will be illustrated in detail, in conjunction with FIG. 2A to FIG. 2L.

For the sake of illustration, in FIG. 2A to FIG. 2L, it is schematically illustrated by taking that the electronic device is a mobile phone, an application installed on the mobile phone is a short video social APP (briefly referred to as application 1), and the multimedia content (briefly referred to as video 1) in the application 1 belongs to a preview stream of online live broadcast 1 as an example.

Scenario I

In scenario I, when the type of the online live broadcast 1 is e-commerce, the electronic device may display basic information of the online live broadcast 1 below real-time information of the online live broadcast 1.

Referring to FIG. 2A to FIG. 2D, FIG. 2A to FIG. 2D are schematic diagrams of a human-machine interaction interface provided by an embodiment of the present disclosure.

Figures 2A, 2B:
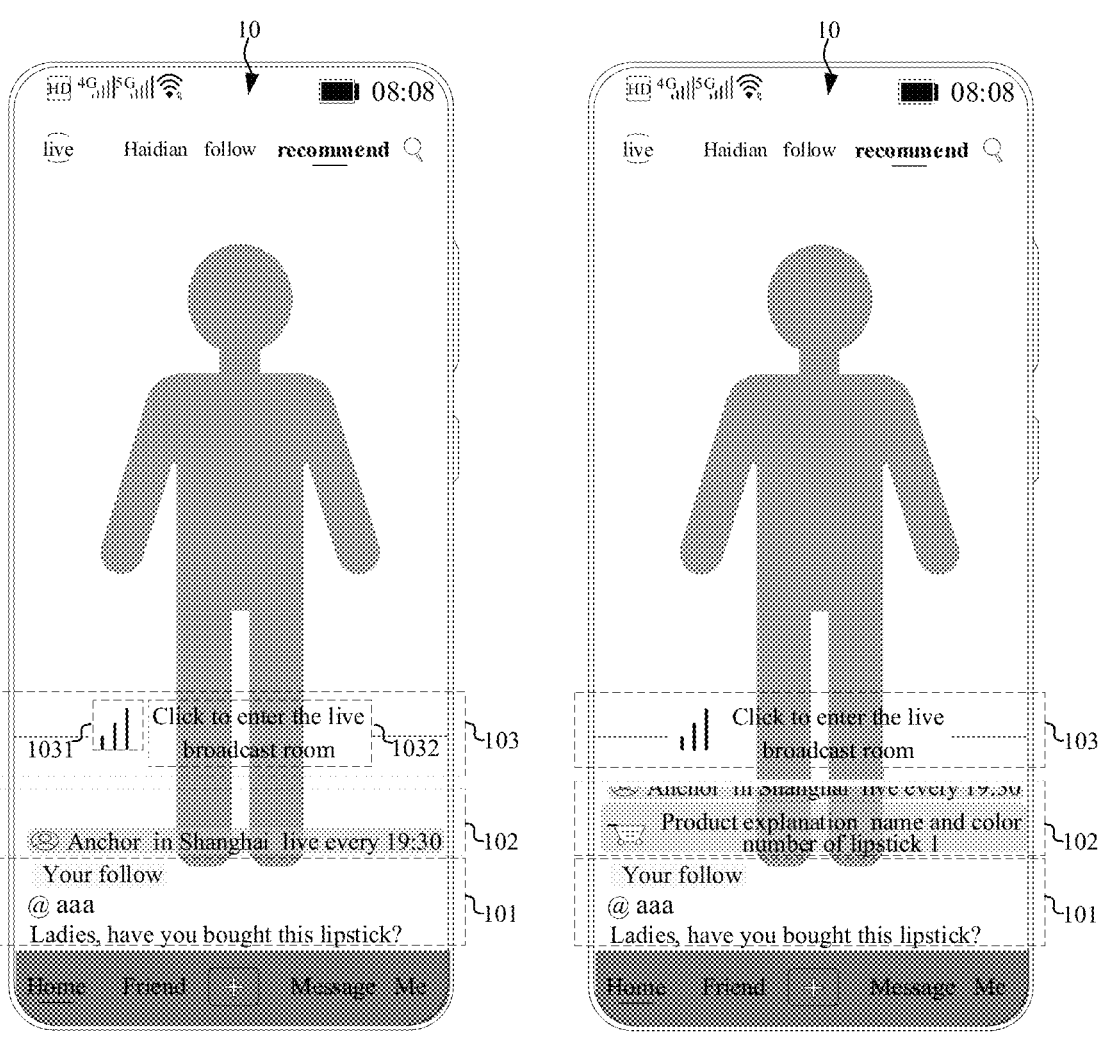

During or after startup, the application 1 may display a user interface 10 exemplarily illustrated in FIG. 2A on the mobile phone. The user interface 10 is used to display a page of the application 1. The application 1 may execute a set of functions on one page of the application 1, for example, playing the video 1, displaying the basic information of the online live broadcast 1, and displaying the real-time information of the online live broadcast 1.

The user interface 10 may include: a region 101 and a region 102; and the region 101 is located below the region 102.

The region 101 is used to display the basic information of the online live broadcast 1, for example, follow tag being "Your audience", anchor nickname being "@aaa", and live broadcast title being "Ladies, have you bought this lipstick?"

The region 102 is used to display the real-time information of the online live broadcast 1, for example, product explanation being "product icon+name and color number of lipstick 1 in the product explanation" and live commentary including "nickname of user 1: The color looks really good" and "nickname of user 2: When the live broadcast ends?", and display extended information of the online live broadcast 1, for example, live broadcast location being "in Shanghai" and live broadcast time being "live broadcast on 19:30 every day". In addition, the user interface 10 may further include: a region 103. The region 103 is used to display the extended information of the online live broadcast 1. The region 103 may include: an icon 1031 and a text 1032. The icon 1031 is used to indicate that the video 1 is in a live state. The text 1032 is used to describe guidance for entering the online live broadcast.

With playing of the video 1, the application 1 may change from the user interface 10 exemplarily illustrated in FIG. 2A to the user interface 10 exemplarily illustrated in FIG. 2B. The region 101 is stably displayed, the extended information of the online live broadcast 1 in the region 102 is displayed as product explanation of the online live broadcast 1 in a scrolling manner, and the region 103 is stably displayed.

Figures 2C, 2D:
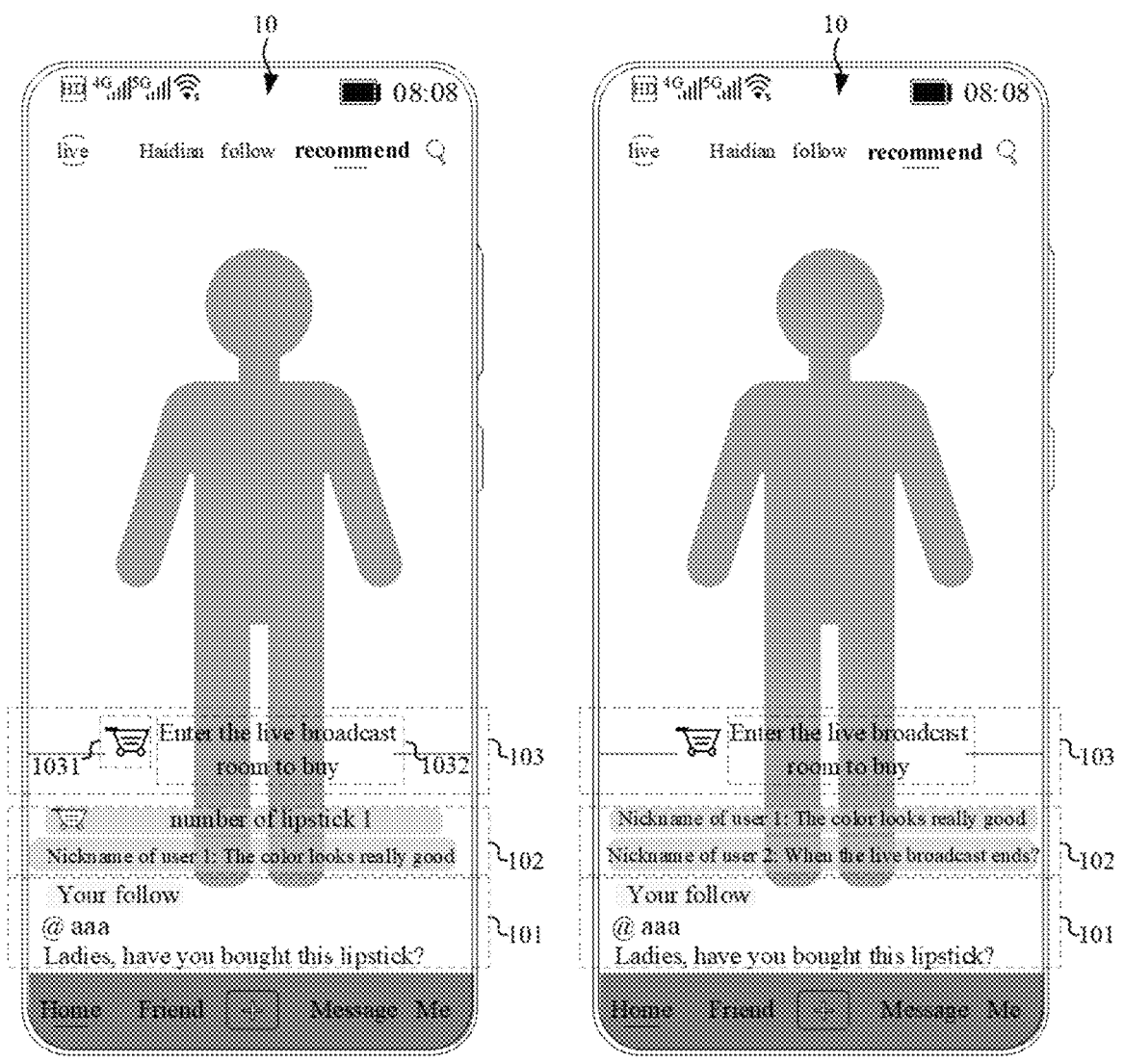

With continued playing of the video 1, the application 1 may change from the user interface 10 exemplarily illustrated in FIG. 2B to the user interface 10 exemplarily illustrated in FIG. 2C. The region 101 is displayed stably, the product explanation of the online live broadcast 1 in the region 102 is displayed as live commentary of the online live broadcast 1 in a scrolling manner, and the region 103 is displayed in an updating manner. The updated icon 1031 is used to indicate that the type of the online live broadcast 1 is e-commerce. The updated text 1032 is used to describe guidance for entering the online live broadcast 1.

With continued playing of the video 1, the application 1 may change from the user interface 10 exemplarily illustrated in FIG. 2C to the user interface 10 exemplarily illustrated in FIG. 2D. The region 101 is stably displayed, the live commentary of the online live broadcast 1 in the region 102 is displayed in a scrolling manner, and the region 103 is stably displayed.

In summary, the application 1 may display the basic information, the real-time information, the extended information, and the guidance information of the online live broadcast 1 while playing the video 1, which exhibits relevant information of the online live broadcast 1 richly and stereoscopically, and enhances the user's interest in entering the online live broadcast 1 for watching and interacting.

In addition, based on the type of the online live broadcast 1, the application 1 may also update the guidance information of the online live broadcast 1, so that the guidance information of the online live broadcast 1 has rich exhibition styles, and so that the user may quickly understand the type of the online live broadcast 1, which helps guide interest of the user in entering the online live broadcast 1 for watching and interaction.

Scenario II

In scenario II, in the case that the type of the online live broadcast 1 is e-commerce, the electronic device may display the basic information of the online live broadcast 1 above the real-time information of the online live broadcast 1.

Referring to FIG. 2E to FIG. 2H, FIG. 2E to FIG. 2H are schematic diagrams of a human-machine interaction interface provided by an embodiment of the present disclosure.

During or after startup, the application 1 may display the user interface 10 exemplarily illustrated in FIG. 2A on the mobile phone. The user interface 10 is used to display a page of the application 1, and the application 1 may execute a set of functions on one page of the application 1, for example, playing the video 1, displaying the basic information of the online live broadcast 1, and displaying the real-time information of the online live broadcast 1.

The user interface 10 may include: a region 104 and a region 105; and the region 104 is located above the region 105.

The region 104 is used to display the basic information of the online live broadcast 1, for example, follow tag being "Your follow" and anchor nickname being "@aaa".

The region 105 is used to display the real-time information of the online live broadcast 1, for example, product explanation being "product icon+name and color number of lipstick 1 in product explanation" and live commentary including "nickname user 1: The color looks really good", "nickname of user 2: When the live broadcast ends?", "nickname user 3: The color looks good", and "nickname user 4: Please try other colors", and display extended information of the online live broadcast 1, for example, live broadcast theme being "A growing anchor, be there or be square", live broadcast location being "in Shanghai" and live broadcast time being "live broadcast on 19:30 every day".

In addition, the user interface 10 may also include: a region 106. The region 106 is used to display the extended information of the online live broadcast 1. The region 106 may include an icon 1061 and text 1062. The icon 1061 is used to indicate that the video 1 is in a live state. The text 1062 is used to describe guidance for entering the online live broadcast.

With playing of the video 1, the application 1 may change from the user interface 10 exemplarily illustrated in FIG. 2E to the user interface 10 exemplarily illustrated in FIG. 2F. The region 104 is stably displayed, the extended information of the online live broadcast 1 in the region 105 is stably displayed, product explanation and live commentary of the online live broadcast 1 in the region 105 are displayed in a scrolling manner, and the region 106 is stably displayed.

With continued playing of the video 1, the application 1 may change from the user interface 10 exemplarily illustrated in FIG. 2F to the user interface 10 exemplarily illustrated in FIG. 2G. The region 104 is displayed stably, extended information of the online live broadcast 1 and live commentary of the online live broadcast 1 in the region 105 are displayed in a scrolling manner, and the region 106 is displayed in an updating manner. The updated icon 1061 is used to indicate that the type of the online live broadcast 1 is e-commerce. The updated text 1062 is used to describe guidance for entering the online live broadcast 1.

With continued playing of the video 1, the application 1 may change from the user interface 10 exemplarily illustrated in FIG. 2G to the user interface 10 exemplarily illustrated in FIG. 2H. The region 104 is stably displayed, live commentary of the online live broadcast 1 in the region 105 is displayed in a scrolling manner, and the region 106 is stably displayed.

In summary, the application 1 may display the basic information, the real-time information, the extended information, and the guidance information of the online live broadcast 1 while playing the video 1, which exhibits relevant information of the online live broadcast 1 richly and stereoscopically, and enhances the user's interest in entering the online live broadcast 1 for watching and interaction.

In addition, based on the type of the online live broadcast 1, the application 1 may also update the guidance information of the online live broadcast 1, so that the guidance information of the online live broadcast 1 has rich exhibition styles, and so that the user may quickly understand the type of the online live broadcast 1, which helps guide interest of the user in entering the online live broadcast 1 for watching and interaction.

Scenario III

In scenario III, assuming that the electronic device displays the basic information of the online live broadcast 1 above the real-time information of the online live broadcast 1 in the mode illustrated in FIG. 2D, then when the type of the online live broadcast 1 is chat, the electronic device may update the guidance information of the online live broadcast 1.

Referring to FIG. 2I to FIG. 2J, FIG. 2I to FIG. 2J are schematic diagrams of a human-machine interaction interface provided by an embodiment of the present disclosure.

During or after startup, the application 1 may display a user interface 20 exemplarily illustrated in FIG. 2I on the mobile phone. The user interface 20 is used to display a page of the application 1, and the application 1 may execute a set of functions on one page of the application 1, for example, playing the video 1, displaying the basic information of the online live broadcast 1, and displaying the real-time information of the online live broadcast 1.

The user interface 20 may include: a region 201 and a region 202; and the region 201 is located above the region 202. The region 201 is used to display the basic information of the online live broadcast 1, for example, follow tag being "Your follow" and anchor nickname being "@aaa".

The region 202 is used to display the real-time information of the online live broadcast 1, for example, product explanation being "product icon+name and color number of lipstick 1 in product explanation" and live commentary including "nickname user 1: The color looks really good" and "nickname of user 2: When the live broadcast ends?", and display the extended information of the online live broadcast 1, for example, live broadcast theme being "A growing anchor, be there or be square", live broadcast location being "in Shanghai" and live broadcast time being "live broadcast on 19:30 every day".

In addition, the user interface 20 may further include: a region 203. The region 203 is used to display the extended information of the online live broadcast 1. The region 203 may include: an icon 2031 and text 2032. The icon 2031 is used to indicate that the video 1 is in a live state. The text 2032 is used to describe guidance for entering the online live broadcast 1.

With continued playing of the video 1, the application 1 may change from the user interface 20 exemplarily illustrated in FIG. 2I to the user interface 20 exemplarily illustrated in FIG. 2J. The region 201 is displayed stably, the region 202 is displayed in a scrolling manner, and the region 203 is displayed in an updating manner. The updated icon 2031 is used to indicate that the type of the online live broadcast 1 is chat. The updated text 2032 is used to describe guidance for entering the online live broadcast 1.

In summary, based on the type of the online live broadcast 1, the application 1 may also update the guidance information of the online live broadcast 1, so that the guidance information of the online live broadcast 1 has rich exhibition styles, and so that the user may quickly understand the type of the online live broadcast 1, which helps guide interest of the user in entering the online live broadcast 1 for watching and interaction.

Scenario IV

In scenario IV, assuming that the electronic device displays the basic information of the online live broadcast 1 above the real-time information of the online live broadcast 1 in the mode illustrated in FIG. 2D, then when the type of the online live broadcast 1 is PK, the electronic device may update the guidance information of the online live broadcast 1.

Figures 2K, 2L:
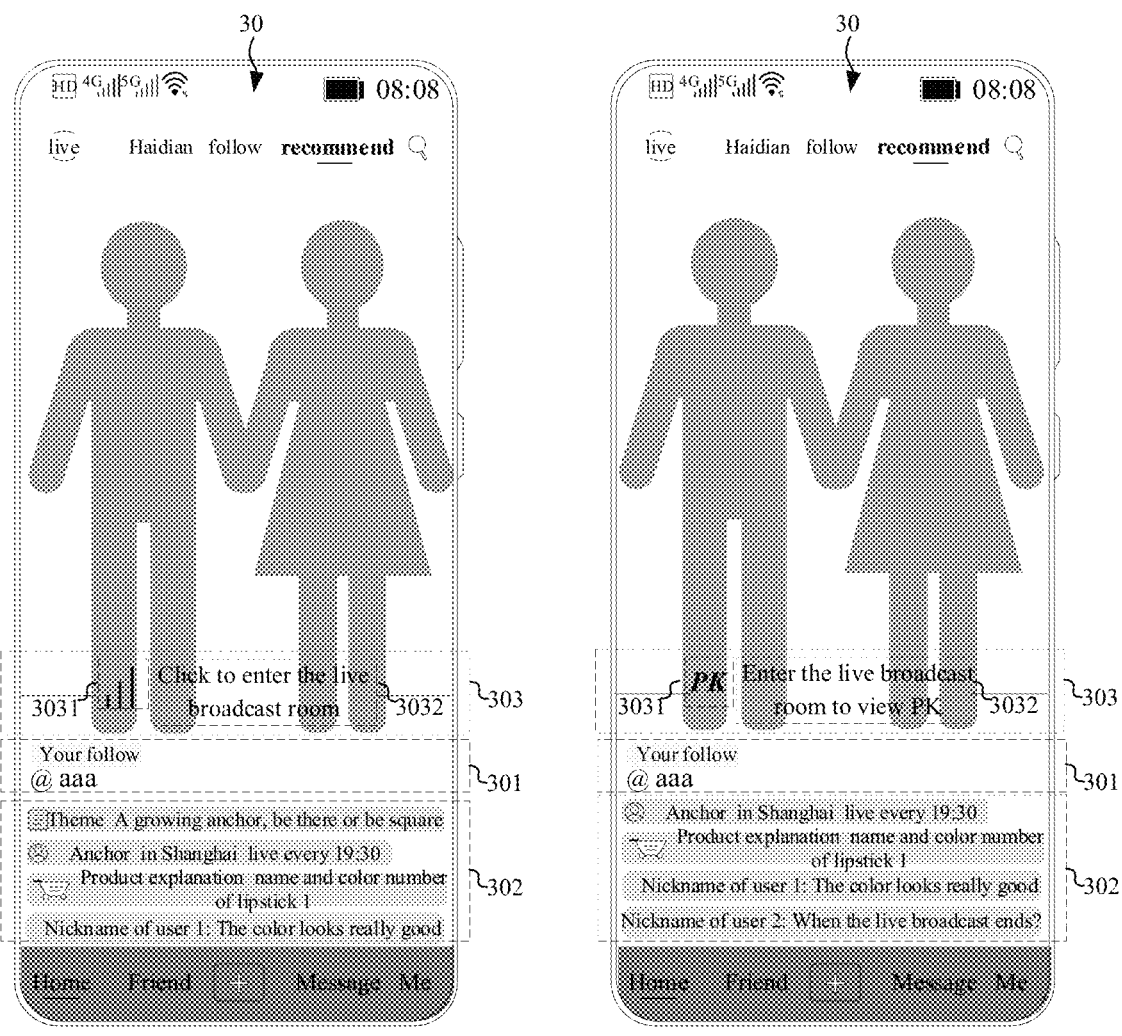

Referring to FIG. 2K to FIG. 2L, FIG. 2K to FIG. 2L are schematic diagrams of a human-machine interaction interface provided by an embodiment of the present disclosure.

During or after startup, the application 1 may display a user interface 30 exemplarily illustrated in FIG. 2K on the mobile phone. The user interface 30 is used to display a page of the application 1, and the application 1 may execute a set of functions on one page of the application 1, for example, playing the video 1, displaying the basic information of the online live broadcast 1, and displaying the real-time information of the online live broadcast 1.

The user interface 30 may include: a region 301 and a region 302; and the region 301 is located above the region 302.

The region 301 is used to display the basic information of the online live broadcast 1, for example, follow tag being "Your follow" and anchor nickname being "@aaa".

The region 302 is used to display the real-time information of the online live broadcast 1, for example, product explanation being "product icon+name and color number of lipstick 1 in product explanation" and live commentary including "nickname user 1: The color looks really good" and "nickname of user 2: when the live broadcast ends?", and display the extended information of the online live broadcast 1, for example, live broadcast theme being "A growing anchor, be there or be square", live broadcast location being "in Shanghai" and live broadcast time being "live broadcast on 19:30 every day".

In addition, the user interface 30 may further include: a region 303. The region 303 is used to display the extended information of the online live broadcast 1. The region 303 may include an icon 3031 and text 3032. The icon 3031 is used to indicate that the video 1 is in a live state. The text 3032 is used to describe guidance for entering the online live broadcast 1.

With continued playing of the video 1, the application 1 may change from the user interface 30 exemplarily illustrated in FIG. 2K to the user interface 30 exemplarily illustrated in FIG. 2L. The region 301 is displayed stably, the region 302 is displayed in a scrolling manner, and the region 303 is displayed in an updating manner. The updated icon 3031 is used to indicate that the type of the online live broadcast 1 is PK. The updated text 3032 is used to describe guidance for entering the online live broadcast 1.

In summary, based on the type of the online live broadcast 1, the application 1 may also update the guidance information of the online live broadcast 1, so that the guidance information of the online live broadcast 1 has rich exhibition styles, and so that the user may quickly understand the type of the online live broadcast 1, which helps guide interest of the user in entering the online live broadcast 1 for watching and interaction.

Exemplarily, the present disclosure provides a page display apparatus for an application.

Figure 3:
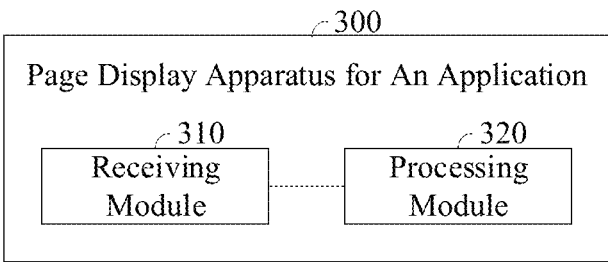
FIG. 3 is a structural schematic diagram of a page display apparatus for an application provided by an embodiment of the present disclosure.

Referring to FIG. 3, FIG. 3 is a structural schematic diagram of a page display apparatus for an application provided by an embodiment of the present disclosure. The page display apparatus for an application according to the present disclosure may be set in an electronic device, and may implement operations of the page display method for an application according to the above-described embodiments of FIG. 1, FIG. 2A to FIG. 2L that correspond to the electronic device.

As illustrated in FIG. 3, a page display apparatus 300 for an application provided by the present disclosure may include: a receiving module 310 and a processing module 320.

The receiving module 310 is configured to receive a play instruction for the multimedia content in the application.

The processing module 320 is configured to, in response to the play instruction, in the case that the multimedia content belongs to a preview stream of an online live broadcast, play the multimedia content and display real-time information of the online live broadcast.

The real-time information of the online live broadcast includes: at least one of live commentary or live explanation.

In some embodiments, the processing module 320 is further configured to display basic information of the online live broadcast in a fixing manner and display the real-time information of the online live broadcast in a scrolling manner. The basic information of the online live broadcast includes: at least one of follow tag, anchor nickname, or live broadcast title.

In some embodiments, the processing module 320 is specifically configured to display the basic information of the online live broadcast above or below the real-time information of the online live broadcast.

In some embodiments, the processing module 320 is further configured to display extended information of the online live broadcast in a fixing manner and display the real-time information of the online live broadcast in a scrolling manner, and after a first preset duration, display the real-time information of the online live broadcast and the extended information of the online live broadcast in a scrolling manner; or, display the real-time information of the online live broadcast and extended information of the online live broadcast in a scrolling manner. The extended information of the online live broadcast includes: at least one of live broadcast location, anchor age, live broadcast time, or live broadcast theme.

In some embodiments, the processing module 320 is further configured to display guidance information of the online live broadcast. The guidance information is used to guide the user to enter the online live broadcast.

In some embodiments, the processing module 320 is further configured to include a guide icon and guide text in the guidance information, and after a second preset duration, update a style of the guide icon and content of the guide text based on the type of the online live broadcast.

In some embodiments, the processing module 320 is further configured to play a live stream of the online live broadcast after receiving a viewing instruction for the online live broadcast.

The page display apparatus for an application provided by the present disclosure may execute the above-described method embodiments. For specific implementation principles and technical effects, the above-described method embodiments may be referred to, and no details will be repeated here.

Exemplarily, the present disclosure provides an electronic device, which includes: one or more processors, a memory, and one or more computer programs. The one or more computer programs are stored in the memory. The one or more processors, when executing the one or more computer programs, cause the electronic device to implement the page display method for an application according to the foregoing embodiments.

Exemplarily, the present disclosure provides a chip system applied to an electronic device including a display, a memory, or a sensor. The chip system includes a processor. When the processor executes computer instructions stored in the memory, the electronic device executes the page display method for an application according to the foregoing embodiments.

Exemplarily, the present disclosure provides a computer readable storage medium, which has a computer program stored thereon. The computer program is processed by a processor to cause an electronic device to execute the page display method for an application according to the foregoing embodiments.

Exemplarily, the present disclosure provides a computer program product. The computer program product, when running on a computer, causes the computer to execute the page display method for an application according to the foregoing embodiments.

In the above-described embodiments, all the functions or part of the functions may be implemented by software, hardware, firmware, or any combination thereof. When implemented by software, it may be implemented in a form of a computer program product in whole or in part. The computer program product includes one or more computer instructions. When the computer loads and executes the computer instructions, the flows or functions described in the embodiments of the present disclosure are executed in whole or in part. The computer may be a general-purpose computer, a special-purpose computer, a computer network, or other programmable apparatus. The computer instructions may be stored in a computer readable storage medium. The computer readable storage medium may be any available medium that can be accessed by a computer or a data storage device including a server, a data center, etc., integrated by one or more available media. The available medium may be a magnetic medium (e.g., a floppy disk, a hard disk, a magnetic tape); an optical medium (e.g., a digital video disc (DVD); or a semiconductor medium (e.g., a solid state disk (SSD)).

It should be noted that, relational terms herein such as "first" and "second" are only used to distinguish one entity or operation from another entity or operation, and do not necessarily require or imply any actual relationship or order between these entities or operations. In addition, the terms "include", "comprise", or any other variants thereof are intended to cover a non-exclusive inclusion, so that a process, a method, a product or a device that includes a series of elements not only includes those elements but also includes other elements that are not expressly listed, or further includes elements inherent to such process, method, product or device. Without more constraints, the elements limited by the statement "including a . . . " or "including one . . . " does not exclude that there is another same or identical element in the process, method, product, or device that includes the element.

The above is only the specific implementation provided to enable those skilled in the art to understand and practice the present disclosure. Various modifications to these embodiments will be readily apparent to those skilled in the art, and the generic principles defined herein may be applied to other embodiments without departing from the spirit or scope of the present disclosure. Therefore, the present disclosure will not be limited to these embodiments described herein, but is to be accorded the widest scope consistent with the principles and novel features disclosed herein.

The invention claimed is:

1. A page display method for an application, comprising:
   receiving a play instruction for multimedia content in the application; and
   in response to the play instruction, playing the multimedia content and displaying real-time information of a live stream, the multimedia content belonging to a preview stream of the live stream;
   wherein the real-time information of the live stream comprises at least one of a live stream commentary or a live stream explanation,
   wherein the method further comprises:
      displaying guidance information of the live stream in an interface of playing the preview stream of the live stream,
   wherein the guidance information is used to guide a user to enter the live stream,
   wherein the guidance information comprises a guide icon and a guide text, and the method further comprises:
      after a second preset duration, updating a style of the guide icon and content of the guide text based on a type of the live stream, and
   wherein an updated guide icon is used to indicate the type of the live stream, and an updated guide text is used to describe guidance for entering the live stream of corresponding type.

2. The method according to claim 1, further comprising:
   displaying basic information of the live stream in a fixing manner, and displaying the real-time information of live stream in a scrolling manner,
   wherein the basic information of the live stream comprises at least one type of a follow tag, an anchor nickname, or a live stream title.

3. The method according to claim 2, wherein the basic information of the live stream is displayed above or below the real-time information of the live stream.

4. The method according to claim 3, further comprising:
   displaying extended information of the live stream in a fixing manner and displaying the real-time information of live stream in a scrolling manner, and after a first preset duration, displaying the real-time information of the live stream and the extended information of the live stream in the scrolling manner; or
   displaying the real-time information of the live stream and the extended information of the live stream in the scrolling manner,
   wherein the extended information of the live stream comprises at least one of a live stream location, an anchor age, live stream time, or a live stream theme.

5. The method according to claim 3, further comprising:

playing a live stream of the live stream after receiving a viewing instruction for the live stream.

6. The method according to claim 2, further comprising:

displaying extended information of the live stream in a fixing manner and displaying the real-time information of live stream in a scrolling manner, and after a first preset duration, displaying the real-time information of the live stream and the extended information of the live stream in the scrolling manner; or displaying the real-time information of the live stream and the extended information of the live stream in the scrolling manner, wherein the extended information of the live stream comprises at least one of a live stream location, an anchor age, live stream time, or a live stream theme.

7. The method according to claim 2, further comprising:

playing a live stream of the live stream after receiving a viewing instruction for the live stream.

8. The method according to claim 1, further comprising:

displaying extended information of the live stream in a fixing manner and displaying the real-time information of live stream in a scrolling manner, and after a first preset duration, displaying the real-time information of the live stream and the extended information of the live stream in the scrolling manner; or displaying the real-time information of the live stream and the extended information of the live stream in the scrolling manner, wherein the extended information of the live stream comprises at least one of a live stream location, an anchor age, live stream time, or a live stream theme.

9. The method according to claim 8, further comprising:

playing a live stream of the live stream after receiving a viewing instruction for the live stream.

10. The method according to claim 1, further comprising:

playing a live stream of the live stream after receiving a viewing instruction for the live stream.

11. A page display apparatus for an application, comprising:

a receiving module, configured to receive a play instruction for multimedia content in the application; and a processing module, configured to, in response to the play instruction, play the multimedia content and display real-time information of a live stream, the multimedia content belonging to a preview stream of the live stream;

wherein the real-time information of the live stream comprises at least one of a live stream commentary or a live stream explanation, wherein the processing module is further configured to display guidance information of the live stream in an interface of playing the preview stream of the live stream, wherein the guidance information is used to guide a user to enter the live stream, wherein the guidance information comprises a guide icon and a guide text, and the processing module is further configured to, after a second preset duration, update a style of the guide icon and content of the guide text based on a type of the live stream, and wherein an updated guide icon is used to indicate the type of the live stream, and an updated guide text is used to describe guidance for entering the live stream of corresponding type.

12. An electronic device, comprising:

one or more processors;

a memory; and one or more computer programs, wherein the one or more computer programs are stored in the memory, and the one or more processors, when executing the one or more computer programs, cause the electronic device to implement the page display method for the application according to claim 1.

13. A non-transitory computer storage medium, comprising computer instructions, wherein the computer instructions, when running on an electronic device, cause the electronic device to execute the page display method for the application according to claim 1.

* * * * *